Figure 4:
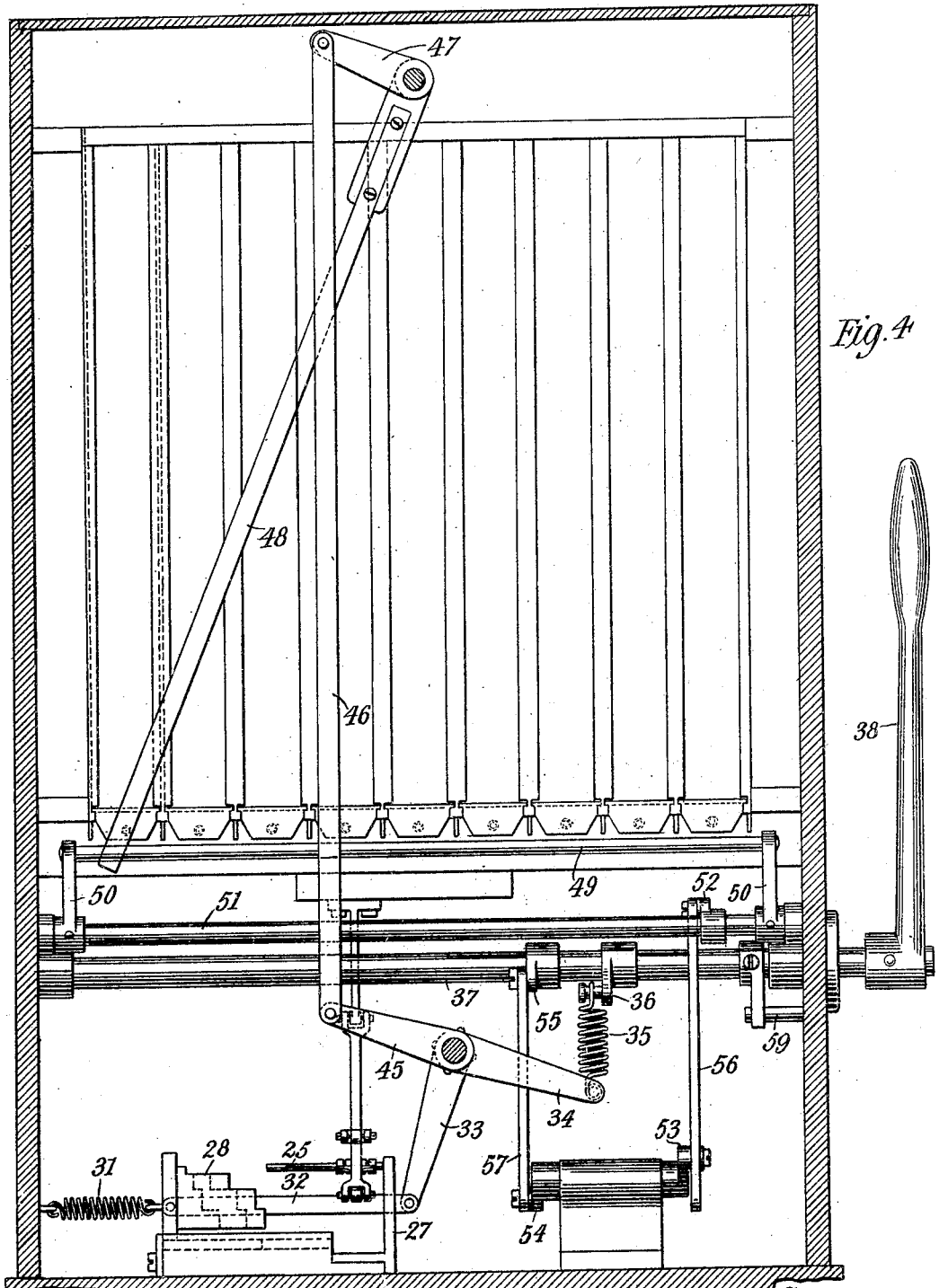

No. 803,002. PATENTED OCT. 31, 1905.
H. N. MARVIN.
APPARATUS FOR DELINEATING CHARACTER OR DISPOSITION OF ANY INDIVIDUAL ACCORDING TO THE CHARACTER OF THE HAND.
APPLICATION FILED APR. 18, 1905.
3 SHEETS—SHEET 1.
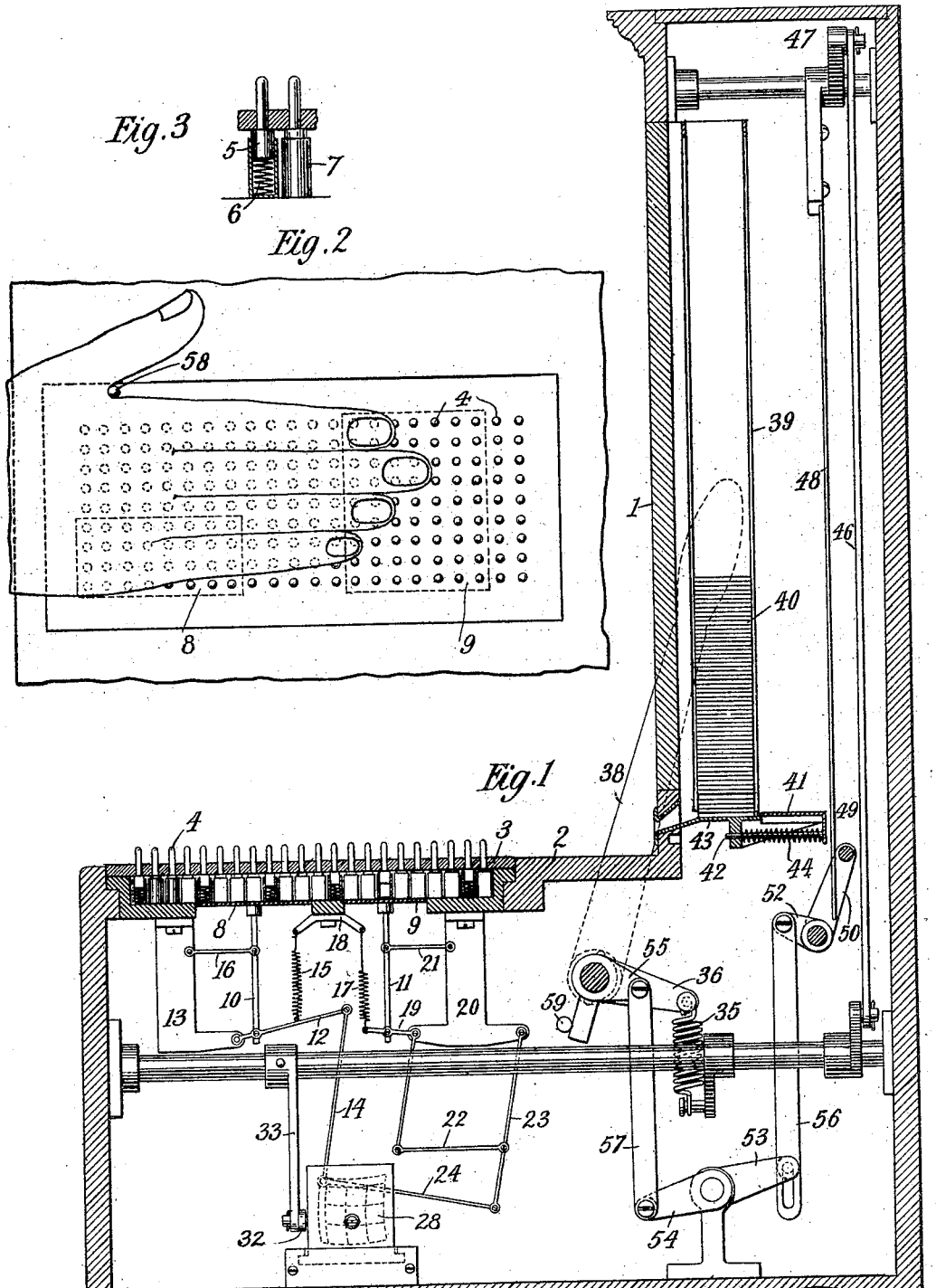
Witnesses
Raphaël Netter
S. S. Dunham
Inventor
H. N. Marvin
By his Attorneys
Kerr, Page & Cooper No. 803,002. PATENTED OCT. 31, 1905.
H. N. MARVIN.
APPARATUS FOR DELINEATING CHARACTER OR DISPOSITION OF ANY
INDIVIDUAL ACCORDING TO THE CHARACTER OF THE HAND.
APPLICATION FILED APR. 18, 1905.
3 SHEETS—SHEET 2.

Witnesses
Raphaël Netter
A S Dunham

Inventor
H. N. Marvin
By his Attorneys
Kerr, Page & Cooper

No. 803,002. PATENTED OCT. 31, 1905.
H. N. MARVIN.
APPARATUS FOR DELINEATING CHARACTER OR DISPOSITION OF ANY
INDIVIDUAL ACCORDING TO THE CHARACTER OF THE HAND.
APPLICATION FILED APR. 18, 1905.

3 SHEETS—SHEET 3.

Witnesses
Raphaël Netter
A. S. Dunham

H. N. Marvin Inventor
By his Attorneys
Kerr, Page & Cooper

UNITED STATES PATENT OFFICE.

HARRY N. MARVIN, OF CANASTOTA, NEW YORK.

APPARATUS FOR DELINEATING CHARACTER OR DISPOSITION OF ANY INDIVIDUAL ACCORDING TO THE CHARACTER OF THE HAND.

No. 803,002.　　　Specification of Letters Patent.　　　Patented Oct. 31, 1905.

Application filed April 18, 1905. Serial No. 256,329.

*To all whom it may concern:*

Be it known that I, HARRY N. MARVIN, a citizen of the United States, residing at Canastota, in the county of Madison and State of New York, have invented certain new and useful Improvements in Apparatus for Delineating Character or Disposition of any Individual According to the Character of the Hand, of which the following is a specification, reference being had to the drawings accompanying and forming a part of the same.

It is generally believed or assumed that the human hand is to some degree an index of the character or disposition of the individual, the latter varying with the particular width, length, or shape of the former.

My present invention is an apparatus for indicating personal characteristics in accordance with the shape of the human hand and is designed for purposes of amusement by giving automatic responses, framed from the results of study of the subject to accord with the size or shape of any hand applied to it.

In general the apparatus comprises an element to which the hand is applied in a prescribed manner and which is differently affected according to the size or shape of the hand, another element which ordinarily consists of a magazine of cards bearing different inscriptions, and an intermediate element which is adapted to deliver or display one or another of such cards according to the particular adjustment of the first element affected by the character of the hand.

In the simplest and most practicable form of the invention which I have devised I employ a series of spring-supported pins or plungers upon which the hand is laid. The number of pins covered by the hand will of course vary with its size, and in order to get an effect due also to the shape of the hand the pins may be divided into two or more groups, which act independently in effecting the adjustment of the devices upon which depends the selection of the card whose inscription corresponds to the particular hand applied. The pins are depressed by the hand, each group imposing upon a counterbalanced plate a pressure proportional to the number of depressed pins in such group, and this pressure is availed of to depress to a corresponding degree the said plates, and thereby set or adjust a stop mechanism that determines the play of a lever or similar contrivance that controls the selection of one of the cards. This last-named operation I effect by means of a hand-lever which through suitable instrumentalities sets an arm in position to discharge a given card corresponding to the number of pins in each group which have been depressed, and by a further movement of said lever forces out such card, which is either delivered through a suitable opening or displayed to view, as the case may be.

It is obvious that the specific construction of the mechanisms thus generally outlined may be very greatly varied without departure from the invention; but in order to enable those skilled in the art to construct and operate the same with readiness I refer now to the drawings, which illustrate my improvement in its preferred form.

Figure 5:
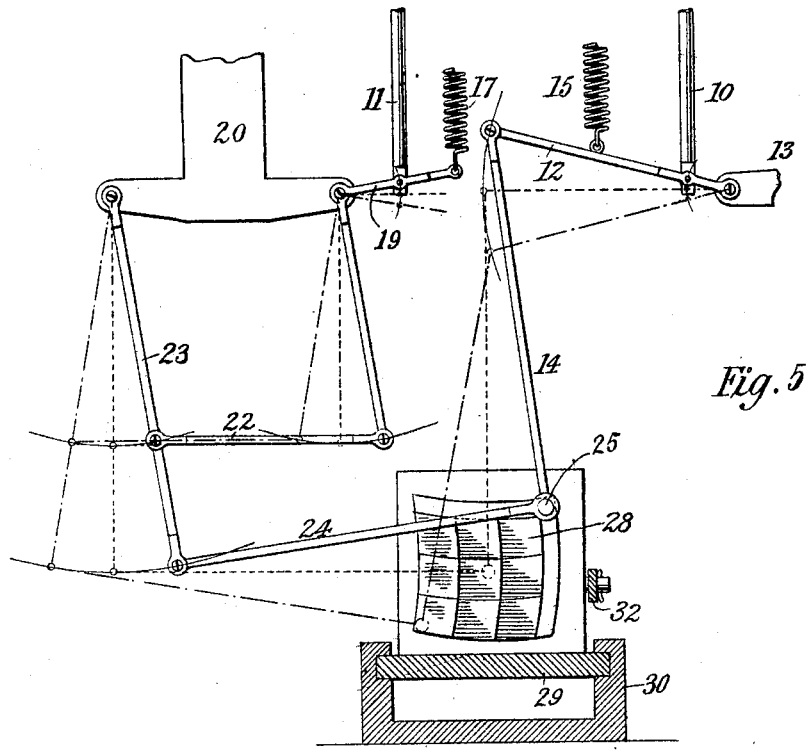
Figure 6:
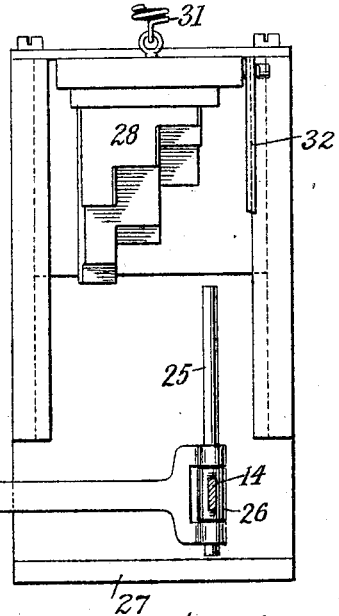

Figure 1 is a view in side elevation of my improved apparatus, the outer casing being in section. Fig. 2 is a top plan view of the series of pins, showing the manner of applying the hand thereto. Fig. 3 is an enlarged detail of two of the pins. Fig. 4 is a rear view in elevation of the operating mechanism of the apparatus. Fig. 5 is an enlarged view, partly diagrammatic, illustrating the operation of the mechanism connected with the pins. Fig. 6 is a top plan view of a part of the same, and Fig. 7 is a perspective view of a detail of the same.

The apparatus is inclosed in a suitable case or cabinet 1, having a horizontally-extended front 2. In the top of the latter is set a perforated plate 3, through which project a number of pins 4, each consisting of a stem of reduced diameter and an enlarged head 5, seated on a coiled or spiral spring 6 within a tube or socket 7. All of the springs, it may be remarked, are of substantially the same tension. Beneath the plate 3 are two counterbalanced plates 8 and 9, supported by rods 10 and 11, respectively, and supporting each a certain number of the sockets 7, containing pins 4. The rod 10 at its lower end is pivoted to a lever 12, one end of which is pivoted to a stationary support 13, while the other end is pivoted to a rod 14. The rod 10, with its plate 8 and pins thereon, is sustained by a spiral spring 15, connected to a fixed support 18 and to the lever 12, respectively, while its parallelism of movement is secured by a link 16, pivotally connected to it and to the support 13. The rod 11 is similarly sustained in a normally elevated position by a spiral spring 17, connected at one end to the support 18 and at the other to a lever 19, pivoted to a stationary part 20. The said rod 11 is also connected to the part 20 by a pivoted link 21 and pivotally connected with lever 19. The lever 19 is a bell-crank or right-angled lever, the longer arm of which is connected by a link 22 with a lever 23, the upper end pivoted to the part 20 and the lower end similarly connected with the end of a rod 24. The end of rod 24 is connected to a stop-rod 25, as shown in Fig. 6, being preferably bifurcated and having sleeves or eyes at its ends for this purpose. Lever 14 is also connected with rod 25, preferably, by means of a sleeve 26.

The mechanism above described consists of a compound system of parallel movements for adjusting the rod 25 vertically and horizontally to given positions, dependent upon the extent of depression of the plates 8 and 9, respectively, and from the nature of the case it will be understood that the character of this mechanism may be greatly varied. More generally considered, the two plates and their accessories constitute a gage for determining the character of the hand, which in the application of a hand is adjusted or set according to its shape or size. In a broad sense these devices measure the length and breadth of a hand; but in the particular arrangement of pins which I have devised the details of the hand are taken into account, such as the shape of the palm and the length of the fingers, and it is a more desirable device on this account.

Figure 7:
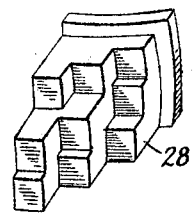

The rod 25 in its various positions lies between a fixed plate 27 and a movable element 28, which consists of a block of wood or metal having steps or faces of different heights, as shown in Fig. 7. The block 28 is mounted on a plate 29, that slides in guides in the sides of a frame 30 and is restrained from forward movement by a spiral spring 31. The said block is moved forward against the force of this spring by a link 32, connected to it at one end and at the other to an arm 33 of a T-shaped lever. Another arm 34 of said lever is connected by a spiral spring 35 to an arm 36, projecting from a rock-shaft 37, which latter is adapted to be partly rotated by a hand-lever 38, secured to it outside of the case 1.

The rod 25, block 28, and plate 27 constitute a movement-limiting device or means for determining the range or extent of movement of other parts of the mechanism. It is obvious that the two elements 25 and 28 are interchangeable and that either may be adjusted in position by the spring plungers or pins 4 relatively to the other.

In the upper portion of the case 1 is a series of chutes 39, which constitute a magazine for the storage of a large number of cards 40, bearing suitable inscriptions. Each chute contains slots at the bottom, at its front, and rear sides of sufficient size to expose fully the edges of the bottom card. A plate 41 is arranged in the rear of each chute, being carried by a pin 42, adapted to slide in a guide in the base 43 of the chute and surrounded by a spiral retractile spring 44. If the plate 41 be pressed forward, it will force the bottom card of the pile out through the slot in front and through a delivery-chute onto the top of the extension 2 of the case. In order that only that card which is properly inscribed may be discharged, the lever-arm 45 is connected by a link 46 with the short arm 47 of a bell-crank lever pivoted in the upper part of the case. The other arm of this lever is extended in a long flexible strip 48, which by the partial rotation of the lever is caused to swing across the series of chutes 39 in the rear of the slides or plates 41. Back of the path of travel of the strip 48 is a bar 49, carried by arms 50, extending from a rock-shaft 51, which latter is adapted to receive partial rotation by means of a system of cranks 52, 53, 54, and 55 and links 56 and 57, connecting it with the main shaft 37, operated by the hand-lever 38.

The construction and mode of operation of the apparatus will be more fully understood from the following description of the manipulation or mode of using the same. Let us assume that a person desires to obtain from the instrument a statement of his personal characteristics based upon the peculiar shape and size of his hand. He lays his right hand upon the bank of pins in the position determined by one or more guide-pins 58, and then applies pressure sufficient to force down all of the pins under the palm and fingers. The number of pins over the plate 9 which are thus depressed will determine the extent to which said plate is forced down. So, likewise, the number of pins depressed over plate 8 will determine the extent of movement of the latter. The depression of these two plates will result in a certain adjustment of the position of the rod 25 with reference to the block 28, as is clearly illustrated in Fig. 5. Having done this, the party with his left hand pulls the handle 38 and turns the rock-shaft 37. The first effect of this operation is to raise the lever-arm 34 by the spring connection 35, which draws forward the block 28 until it encounters the rod 25. As the latter is held against the face of plate 27 the movement of the block 28 is arrested; but the extent of its forward movement will be determined by the position of the rod 25, since the steps or faces on the block are all of different heights. This movement of the lever-arms 33 and 45 also shifts the strip 48, so that it will lie immediately back of one of the slides 41 when the forward movement of the block 28 is arrested. A further turning movement of the rock-shaft 37, which is permitted by the extension of the spring 35, throws the rod 49 forward against the strip 48 and discharges the bottom card from one of the chutes. The handle 38 is then released, when by the action of the springs 31 and 35 it will be returned to its normal position. A suitable stop 59 is employed to limit this movement.

Mechanical skill and the ingenuity of the constructor will suggest many features that will add to the interest and capabilities of the apparatus. It is manifest that the block 28, for example, may be made with a large number of faces and that many more chutes may be employed; but these are not matters of vital importance to the invention, which I believe to be defined as follows:

I claim—

1. In an apparatus of the kind described, the combination with a gage for the hand, of a series of cards stored in different positions in a magazine, and means for discharging said cards singly, the operative position of which is dependent upon the adjustment of the gage according to the character of a hand applied thereto, as set forth.

2. In an apparatus of the kind described, the combination with a gage for the hand, of mechanism for delivering a card with a given inscription and means for actuating the same dependent upon the adjustment of the gage according to the character of the hand applied thereto, as set forth.

3. In an apparatus of the kind described, the combination with mechanism for delivering cards bearing given inscriptions, of a gage for the hand, and intermediate mechanism for determining the particular card delivered, according to the extent or range of its movement, dependent upon the adjustment of said gage resulting from the character of the hand applied thereto, as set forth.

4. In an apparatus of the kind described, the combination with a plurality of spring-plungers, a movement-limiting device adjustable according to the number and position of the plungers depressed by a hand applied thereto, a series of cards bearing different inscriptions, selecting mechanism for delivering said cards singly, and means for determining the operative position of the same, the range or extent of the movement of which is dependent upon the adjustment of the said limiting device, as set forth.

5. In an apparatus of the kind described, the combination with a plurality of spring-plungers, of a movement limiting-device adjustable according to the number and position of the plungers depressed by a hand applied thereto, of a series of chutes for storing cards bearing different inscriptions, means for discharging a card from any one of the chutes and means for adjusting the same to operative position with respect to any of the chutes, dependent for range of movement upon the adjustment of the said limiting device, as set forth.

6. In an apparatus of the kind described, the combination with a plurality of spring-plungers of a plurality of movable plates, each supporting a group of said plungers, a movement-limiting device adjustable by the movement of the said plates determined by the number of plungers supported thereby which are depressed by a hand applied to them, a series of piles of cards bearing different inscriptions, means for removing a card from any one of the piles and means for adjusting the same to operative position with respect to any given pile, dependent for range of movement upon the adjustment of the said limiting devices, as set forth.

7. In an apparatus of the kind described, the combination with a plurality of spring-plungers, counterbalanced plates supporting groups of said plungers, a stop connected to said plates and adjustable thereby to positions dependent upon the extent to which the plates are moved by the depression of the plungers which they carry, a series of piles of cards bearing different inscriptions, means for removing a card from any one of the piles, and means for adjusting the same to operative position with respect to any given pile, dependent for range of movement upon the position to which said stop is adjusted, as set forth.

8. The combination with a stationary plate, 27, the horizontally and vertically adjustable rod or stop 25 and the block 28 with faces in different planes and movable toward the rod 25, as set forth.

9. The combination with the stop mechanism and means for adjusting the same according to the character of a hand, a series of card-chutes, means for discharging the cards therefrom, a lever for setting or adjusting the same in operative relation with respect to the different chutes, and dependent for its range of movement upon the adjustment of the stop, and means for operating the said lever and card-discharging devices, as set forth.

10. The combination with the stop mechanism and means for adjusting the same according to the character of a hand, a series of card-chutes, means for discharging the cards therefrom, means limited in its movement by the adjustment of the stop mechanism, for setting the card-discharging devices in operative relation with respect to the different chutes, a rock-shaft and handle for operating the same through a yielding connection, and adapted also to operate the card-discharging devices, as set forth.

11. The combination with the spring-seated pins or plungers and two counterbalanced plates 8 and 9 carrying groups of the same, of the stop mechanism, parallel lever movements intermediate to the said plates and the stop mechanism for adjusting the same according to the number and position of the pins depressed over each plate, a series of card-chutes and means dependent upon the adjustment of the stop mechanism for discharging a card from any given chute, as set forth.

12. The combination with the spring-seated pins or plungers, and counterbalanced plates 8 and 9, carrying groups of the same, the rod 25, parallel lever movements supporting the rod from side plates, the movable block 28 having faces at different levels, a series of card-chutes and means dependent upon the position of the rod 25 with respect to the block 28 for discharging a card from any given chute, as set forth.

HARRY N. MARVIN.

Witnesses:
 HERMAN CASLOR,
 CHARLES W. JONES.